United States Patent
Li et al.

(10) Patent No.: US 9,794,192 B2
(45) Date of Patent: Oct. 17, 2017

(54) METHOD AND DEVICE FOR ALLOCATING PACKET SWITCHING RESOURCE

(71) Applicant: HUAWEI TECHNOLOGIES CO., LTD., Shenzhen, Guangdong (CN)

(72) Inventors: Congqi Li, Shenzhen (CN); Zhiyong Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 222 days.

(21) Appl. No.: 14/511,431

(22) Filed: Oct. 10, 2014

(65) Prior Publication Data
US 2015/0023354 A1 Jan. 22, 2015

Related U.S. Application Data

(63) Continuation of application No. PCT/CN2012/084824, filed on Nov. 19, 2012.

(51) Int. Cl.
H04W 72/04 (2009.01)
H04L 12/927 (2013.01)
(Continued)

(52) U.S. Cl.
CPC .......... *H04L 47/805* (2013.01); *H04L 45/02* (2013.01); *H04L 45/125* (2013.01);
(Continued)

(58) Field of Classification Search
None
See application file for complete search history.

(56) References Cited

U.S. PATENT DOCUMENTS

2006/0007937 A1* 1/2006 Sharma ............... H04L 12/5695
370/395.21
2006/0182119 A1 8/2006 Li et al.
(Continued)

FOREIGN PATENT DOCUMENTS

CN 1728702 A 2/2006
CN 101072180 11/2007
(Continued)

OTHER PUBLICATIONS

Chinese Office Action dated Dec. 25, 2014 in corresponding Chinese Patent Application No. 201280002136.5.
(Continued)

*Primary Examiner* — Brandon Renner
(74) *Attorney, Agent, or Firm* — Staas & Halsey LLP

(57) ABSTRACT

Embodiments of the present invention provide a method and a device for allocating a packet switching resource, which includes: receiving, by a management plane unit, a service transport request carrying service information, where the service information includes source node information, sink node information, quality of service QoS requirement information, and bandwidth requirement information; determining, by the management plane unit, at least one transport path according to the service information and a preset resource allocation policy, and generating a routing table entry/forwarding table entry according to the at least one transport path; and sending, by the management plane unit, the routing table entry/forwarding table entry to data plane units of packet switching devices of each transport path of the at least one transport path. According to the embodiments, transparent and controllable allocation of a network bandwidth resource is implemented, so that utilization efficiency of a network resource is improved.

14 Claims, 5 Drawing Sheets

(51) Int. Cl.
H04L 12/931 (2013.01)
H04L 12/741 (2013.01)
H04L 12/751 (2013.01)
H04L 12/725 (2013.01)
H04L 12/729 (2013.01)
H04L 12/717 (2013.01)
H04L 12/913 (2013.01)

(52) U.S. Cl.
CPC .......... H04L 45/302 (2013.01); H04L 45/42 (2013.01); H04L 45/745 (2013.01); H04L 47/724 (2013.01); H04L 49/205 (2013.01); H04L 49/65 (2013.01)

(56) References Cited

U.S. PATENT DOCUMENTS

| | | | | |
|---|---|---|---|---|
| 2009/0168787 | A1* | 7/2009 | Ansari | H04L 12/66 370/401 |
| 2009/0310481 | A1* | 12/2009 | Deng | H04L 12/437 370/223 |
| 2010/0027517 | A1* | 2/2010 | Bonta | H04L 12/5695 370/338 |
| 2010/0080235 | A1* | 4/2010 | Yamate | H04L 45/00 370/395.31 |
| 2010/0124190 | A1* | 5/2010 | Bahr | H04L 45/48 370/328 |
| 2010/0262705 | A1 | 10/2010 | Li | |
| 2012/0014387 | A1* | 1/2012 | Dunbar | H04L 12/4625 370/395.53 |
| 2012/0163171 | A1* | 6/2012 | Lee | H04W 40/12 370/231 |
| 2012/0182991 | A1* | 7/2012 | Vazquez | H04L 12/2838 370/390 |
| 2014/0004865 | A1* | 1/2014 | Bhargava | H04W 74/0816 455/445 |
| 2014/0293778 | A1* | 10/2014 | Fernandez-Palacios Gimenez | H04L 45/302 370/230 |

FOREIGN PATENT DOCUMENTS

| | | |
|---|---|---|
| CN | 101170497 | 4/2008 |
| CN | 101364926 A | 2/2009 |
| CN | 101374096 A | 2/2009 |

OTHER PUBLICATIONS

PCT International Search Report issued on Aug. 29, 2013 in corresponding International Patent Application No. PCT/CN2012/084824.
Hendrick, "Routing Information Protocol", Network Working Group, Jun. 1988, pp. 1-33.
International Search Report mailed Aug. 29, 2013, in corresponding International Patent Application No. PCT/CN2012/084824.
Extended European Search Report mailed Mar. 17, 2015 in corresponding European Patent Application No. 12888492.1.

* cited by examiner

METHOD AND DEVICE FOR ALLOCATING PACKET SWITCHING RESOURCE

CROSS-REFERENCE TO RELATED APPLICATIONS

This application is a continuation of International Application No. PCT/CN2012/084824, filed on Nov. 19, 2012, which is hereby incorporated by reference in its entirety.

TECHNICAL FIELD

Embodiments of the present invention relate to the communications technologies, and in particular, to a method and a device for allocating a packet switching resource.

BACKGROUND

With the vigorous development of data services, packet data switching develops rapidly. A comprehensive switching platform that integrates a data service, a voice service, and a video service also becomes a development focus in the industry. As data switching networks keep growing in scale and service traffic increases rapidly, a packet switching device becomes more and more important in network communications.

In the prior art, packet switching devices in a same autonomous area or packet switching devices at borders of different autonomous areas exchange routing information, port delay information, port priority order information, and port bandwidth information with each other. The information is transported repeatedly among the packet switching devices, and each packet switching device can obtain information such as topology of a network in which each packet switching device is located. On the basis of the information, a control plane of a packet switching device generates a routing table or a forwarding table, and checks in real time whether a current routing table or forwarding table requires modification, update, deletion, or addition. That is, the routing table or forwarding table is maintained by the control plane all the time, and the control plane maintains the routing table and the forwarding table according to network information obtained by the packet switching devices through exchange.

The control plane of the packet switching device decides working parameters of a data plane, such as a routing table entry and a forwarding table entry, in which causes that service indexes such as work efficiency and bandwidth utilization efficiency of the data plane are closely related to design of the control plane. The more complex a network protocol of the control plane is, the less visible the service indexes of the data plane are, so that bandwidth allocation is completely nontransparent and also uncontrollable, thereby reducing utilization efficiency of a network resource.

A conventional packet switching device may configure entries of a static routing table/forwarding table through a CLI (Command Line Interface, command line interface) or GUI (Graphical User Interface, graphical user interface). However, the configuration of these entries indicates only a static egress or ingress direction of a single node and is irrelevant to a service. A plurality of nodes still needs to spread static routing table/forwarding table entries and other learning entries to each other to comprehend topology of an entire network, so as to decide a forwarding operation for each service packet. A service forwarding operation of each node is still restrained by a spread degree of topology information and a calculating process of a control plane of each node, and service routing and resource allocation are still uncontrollable and nontransparent.

SUMMARY

Embodiments of the present invention provide a method and a device for allocating a packet switching resource, so as to implement transparent and controllable allocation of a network bandwidth resource, thereby improving utilization efficiency of a network resource.

In a first aspect, an embodiment of the present invention provides a method for allocating a packet switching resource, which includes:
  receiving, by a management plane unit, a service transport request carrying service information, where the service information includes source node information, sink node information, quality of service QoS requirement information, and bandwidth requirement information;
  determining, by the management plane unit, at least one transport path according to the service information and a preset resource allocation policy, and generating a routing table entry/forwarding table entry according to the at least one transport path; and
  sending, by the management plane unit, the routing table entry/forwarding table entry to data plane units of packet switching devices of each transport path of the at least one transport path.

In a first possible implementation manner, before the determining, by the management plane unit, at least one transport path according to the service information and a preset resource allocation policy, the method may further include:
  receiving, by the management plane unit, network information sent by a control plane unit of a packet switching device; and
  the determining, by the management plane unit, at least one transport path according to the service information and a preset resource allocation policy specifically is:
  determining, by the management plane unit, the at least one transport path according to the service information, the preset resource allocation policy, and the network information.

In a second possible implementation manner, the method for allocating a packet switching resource further includes:
  sending, by the management plane unit, a control plane configuration parameter to a control plane unit of a packet switching device, so that the control plane unit of the packet switching device configures a routing table/forwarding table of the packet switching device according to the control plane configuration parameter.

In combination with the second possible implementation manner of the first aspect, in a third possible implementation manner, the control plane configuration parameter includes a working parameter, a policy parameter, and a network protocol parameter.

In a fourth possible implementation manner, the service information further includes any one or a combination of a plurality of the following:
  a minimum hop count, a minimum delay, a minimum cost, highest availability, and a shortest path.

In combination with the fourth possible implementation manner of the first aspect, in a fifth possible implementation manner, the service information further includes any one or a combination of a plurality of the following:
  an explicit node, explicit path information, delay requirement information, and service availability information.

In a second aspect, an embodiment of the present invention provides a method for allocating a packet switching resource, which includes:
  receiving, by a data plane unit, a routing table/forwarding table sent by a management plane unit of a network management device;
  determining, by the data plane unit, a next hop node according to the routing table/forwarding table; and
  sending, by the data plane unit, received service data to the next hop node.

In a first possible implementation manner, the method for allocating a packet switching resource further includes:
  collecting, by a control plane unit, network information, and sending the network information to the management plane unit of the network management device.

In combination with the first possible implementation manner of the second aspect, in a second possible implementation manner, the method for allocating a packet switching resource further includes:
  receiving, by the control plane unit, control plane configuration information sent by the management plane unit of the network management device, and configuring a routing table/forwarding table of a packet switching device according to the control plane configuration information.

In combination with the second possible implementation manner of the second aspect, in a third possible implementation manner, the control plane configuration information includes a working parameter, a policy parameter, and a network protocol parameter.

In a fourth possible implementation manner, the service information further includes any one or a combination of a plurality of the following:
  a minimum hop count, a minimum delay, a minimum cost, highest availability, and a shortest path.

In combination with the fourth possible implementation manner of the second aspect, in a fifth possible implementation manner, the service information further includes any one or a combination of a plurality of the following:
  an explicit node, explicit path information, delay requirement information, and service availability information.

In a third aspect, an embodiment of the present invention provides a network management device, which includes a management plane unit, where the management plane unit includes:
  a receiving subunit, configured to receive a service transport request carrying service information, where the service information includes source node information, sink node information, quality of service QoS requirement information, and bandwidth requirement information;
  a processing subunit, connected to the receiving subunit, and configured to determine at least one transport path according to the service information and a preset resource allocation policy, and generate a routing table/forwarding table according to the at least one transport path; and
  a sending subunit, connected to the processing subunit, and configured to send the routing table/forwarding table to data plane units of packet switching devices of each transport path of the at least one transport path.

In a first possible implementation manner, the receiving subunit is further configured to receive network information sent by a control plane unit of a packet switching device; and the processing subunit is specifically configured to determine the at least one transport path according to the service information, the preset resource allocation policy, and the network information.

In a second possible implementation manner, the sending subunit is further configured to send a control plane configuration parameter to a control plane unit of a packet switching device, so that the control plane unit of the packet switching device configures a routing table/forwarding table of the packet switching device according to the control plane configuration parameter.

In combination with the second possible implementation manner of the third aspect, in a third possible implementation manner, the control plane configuration parameter includes a working parameter, a policy parameter, and a network protocol parameter.

In a fourth aspect, an embodiment of the present invention provides a packet switching device, which includes a data plane unit, where the data plane unit includes:
  a receiving subunit, configured to receive a routing table/forwarding table sent by a management plane unit of a network management device;
  a processing subunit, connected to the receiving subunit, and configured to determine a next hop node according to the routing table/forwarding table; and
  a sending subunit, connected to the processing subunit, and configured to send received service data to the next hop node.

In a first possible implementation manner, the packet switching device further includes:
  a control plane unit, configured to collect network information, and send the network information to the management plane unit of the network management device.

In combination with the first possible implementation manner of the fourth aspect, in a second possible implementation manner, the control plane unit is further configured to receive control plane configuration information sent by the management plane unit of the network management device, and configure a routing table/forwarding table of the packet switching device according to the control plane configuration information.

In combination with the second possible implementation manner of the fourth aspect, in a third possible implementation manner, the control plane configuration information includes a working parameter, a policy parameter, and a network protocol parameter.

In a fifth aspect, an embodiment of the present invention provides a network management device, which includes a management plane unit, where the management plane unit includes:
  a receiver, configured to receive a service transport request carrying service information, where the service information includes source node information, sink node information, quality of service QoS requirement information, and bandwidth requirement information;
  a processor, connected to the receiver, and configured to determine at least one transport path according to the service information and a preset resource allocation policy, and generate a routing table/forwarding table according to the at least one transport path; and
  a sender, connected to the processor, and configured to send the routing table/forwarding table to data plane units of packet switching devices of each transport path of the at least one transport path.

In a sixth aspect, an embodiment of the present invention provides a packet switching device, which includes a data plane unit, where the data plane unit includes:
  a receiver, configured to receive a routing table/forwarding table sent by a network management device;

a processor, connected to the receiver, and configured to determine a next hop node according to the routing table/forwarding table; and a sender, connected to the processor, and configured to send received service data to the next hop node.

With the method and the device for allocating a packet switching resource provided in the embodiments of the present invention, a management plane unit receives a service transport request carrying service information, where the service information includes source node information, sink node information, quality of service QoS requirement information, and bandwidth requirement information; determines at least one transport path according to the service information and a preset resource allocation policy, and generates a routing table/forwarding table according to the at least one transport path; and sends the routing table/forwarding table to data plane units of packet switching devices of each transport path of the at least one transport path. A routing table/forwarding table entry is generated by the management plane unit rather than by a control plane unit of a packet switching device. Therefore, a data plane unit of a packet switching device no longer works depending on a network protocol of a control plane unit, and the data plane unit can perform corresponding routing or forwarding work on a specified service under the configuration of a management plane unit. Furthermore, the management plane unit allocates, in a process of generating a routing table/forwarding table, a network bandwidth resource for a service according to a service requirement. Therefore, allocation of a network bandwidth resource is transparent and controllable, so that utilization efficiency of a network resource is improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
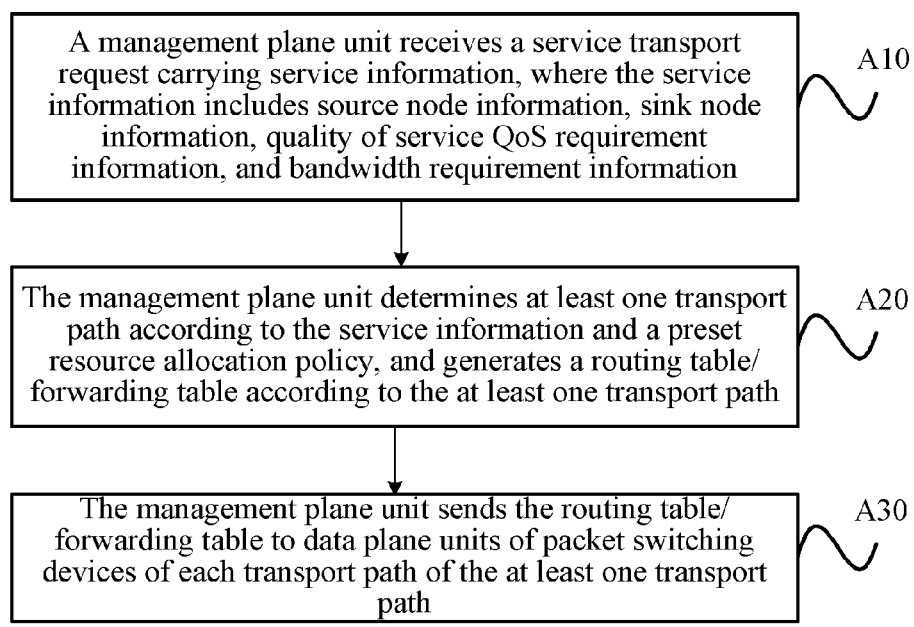
FIG. 1 is a flow chart of a first method for allocating a packet switching resource according to an embodiment of the present invention.

FIG. 1 is a flow chart of a first method for allocating a packet switching resource according to an embodiment of the present invention. As shown in FIG. 1, the method for allocating a packet switching resource according to this embodiment is specifically applicable to a packet switched network. The packet switched network may be based on, but is not limited to, a network routing protocol such as RIP (Routing Information Protocol, routing information protocol), IGRP (Interior Gateway Routing Protocol, interior gateway routing protocol), OSPR (Open Shortest Path First, open shortest path first), EIGRP (Enhanced Interior Gateway Routing Protocol, enhanced interior gateway routing protocol), IS-IS (Intermediate System to Intermediate System, intermediate system to intermediate system routing protocol), BGP (Border Gateway Protocol, border gateway protocol), IDRP (Internal Domain Routing Protocol, internal domain routing protocol), EGP (External Gateway Protocol, external gateway protocol), or MPLS (Multi Protocol Label Switching, multi protocol label switching). A plurality of packet switching devices is disposed in the packet switched network, so as to implement data transmission. A management plane and a data plane are disposed in the packet switched network, and a control plane may further be disposed. In the method for allocating a packet switching resource according to this embodiment, resource allocation is determined by the management plane first, and then is executed by the data plane.

The method for allocating a packet switching resource according to this embodiment specifically includes:

Step A10: A management plane unit receives a service transport request carrying service information, where the service information includes source node information, sink node information, quality of service QoS requirement information, and bandwidth requirement information.

Step A20: The management plane unit determines at least one transport path according to the service information and a preset resource allocation policy, and generates a routing table/forwarding table according to the at least one transport path.

Step A30: The management plane unit sends the routing table/forwarding table to data plane units of packet switching devices of each transport path of the at least one transport path.

Specifically, when a carrier needs to create a new service, a service transport request is transported to a management plane unit of a corresponding packet switched network. In a practical application process, a management plane unit may be implemented in the form of software and/or hardware. For example, a packet switching device may be configured in the form of a GUI or a command interface in a network management device of a packet switched network, so as to implement a management plane function. The service transport request carries service information, and the service information is used for reflecting a requirement of the new service. The service information may include, but is not limited to, source node information, sink node information, quality of service QoS requirement information, and bandwidth requirement information. The source node information may specifically include relevant information such as address information and port information of a source node of the new service. The sink node information may specifically include relevant information such as address information and port information of a sink node of the new service. The quality of service (Quality of Service, referred to as QoS) requirement information is used for indicating QoS required by the new service. The bandwidth requirement information is used for indicating a network bandwidth resource required by the new service. For a service that has a relatively high network requirement, for example, a real time control service, the service information may further include availability information. The availability information is specifically used for indicating whether the service requires link protection or path protection, and times of protection, so as to ensure that a ratio of service interruption time is smaller than a preset ratio value, where the preset ratio value may be, for example, 0.001% or 0.0001%.

The preset resource allocation policy is specifically preset. For example, different service transport levels may be preset. Resource allocation policies corresponding to these services of different levels are also different. A resource allocation policy may be specifically a policy such as a minimum hop count, a minimum delay, a minimum cost, highest availability, or a shortest path, and may also be a policy made by taking factors such as a hop count, a delay, a cost, availability, and a path into consideration. The management plane unit allocates a resource for the service according to the service information and a preset resource allocation policy, and determines at least one transport path. A source node of each transport path is a node corresponding to the source node information. A sink node of each transport path is a node corresponding to the sink node information. In a practical application, the service information may further include an explicit node or path information, delay requirement information, and reliability requirement information, and the like. A network management device may determine a demand of a service according to the service information, and determine, for the service, at least one transport path meeting the demand. When the transport path has been determined, information of all nodes on the transport path is also determined, and a node on the transport path is a packet switching device through which the transport path passes. The management plane unit generates, based on the path, a corresponding routing table/forwarding table for all nodes on the path for a corresponding service, and specifically, may generate a routing table entry/forwarding table entry, and then, sends the routing table entry/forwarding table entry to a data plane unit of a packet switching device of a corresponding node. When receiving a corresponding service data packet, a data plane of the packet switching device determines a next hop port according to the routing table entry/forwarding table entry delivered by the management plane unit, sends service data to a priority queue, and when a sending condition is met, sends the service data to the next hop node. Similarly, a packet corresponding to a service starts from a source node, is forwarded by several nodes, and then reaches a destination node. Transport of all packets of the service is accomplished according to a resource configured by the management plane unit. In the present invention, a routing table/forwarding table is generated by a management plane unit according to a centralized control policy rather than by a control plane unit of a packet switching device, and the management plane unit allocates, in a process of generating the routing table/forwarding table, a network bandwidth resource for a service according to a service demand. Therefore, allocation of a network bandwidth resource is transparent and controllable.

A data plane in the present invention may be a single network layer, or may also include a plurality of network layers. These network layers include, but are not limited to, IP (Internet Protocol, Internet protocol), MPLS, MPLS-TP (Transport Profile for MPLS, transport profile for multi protocol label switching), VLAN (Virtual Local Area Network, virtual local area network), MAC (Media Access Control, media access control), and even further includes ODUk (optical channel data unit-k, optical channel data unit-k), and an OCH layer Routing tables/forwarding tables corresponding to different network layers are independent from each other. The processing of the service at a same node may involve a single network layer or may also involve a plurality of network layers. After determining the path of the service, the management plane unit also determines the processing of the service in different network layers of each node, and generates a corresponding routing table entry/forwarding table entry for a corresponding network layer. Routing table entries/forwarding table entries corresponding to different network layers of the same node are delivered to different network layers of a data plane of the node, so as to provide guidance for data forwarding operations of different network layers of the node.

With the method for allocating a packet switching resource provided in this embodiment, a management plane unit receives a service transport request carrying service information, where the service information includes source node information, sink node information, quality of service QoS requirement information, and bandwidth requirement information; determines at least one transport path according to the service information and a preset resource allocation policy, and generates a routing table/forwarding table according to the at least one transport path; and sends the routing table/forwarding table to data plane units of packet switching devices of each transport path of the at least one transport path. A routing table/forwarding table is generated by the management plane unit rather than by a control plane unit of a packet switching device. Therefore, a data plane unit of a packet switching device no longer works depending on a network protocol of a control plane unit, and the data plane unit can perform corresponding routing or forwarding work on a specified service under the configuration of a management plane unit. Furthermore, the management plane unit allocates, in a process of generating a routing table/forwarding table, a network bandwidth resource for a service according to a service requirement. Therefore, allocation of a network bandwidth resource is transparent and controllable, so that utilization efficiency of a network resource is improved.

Figure 2:
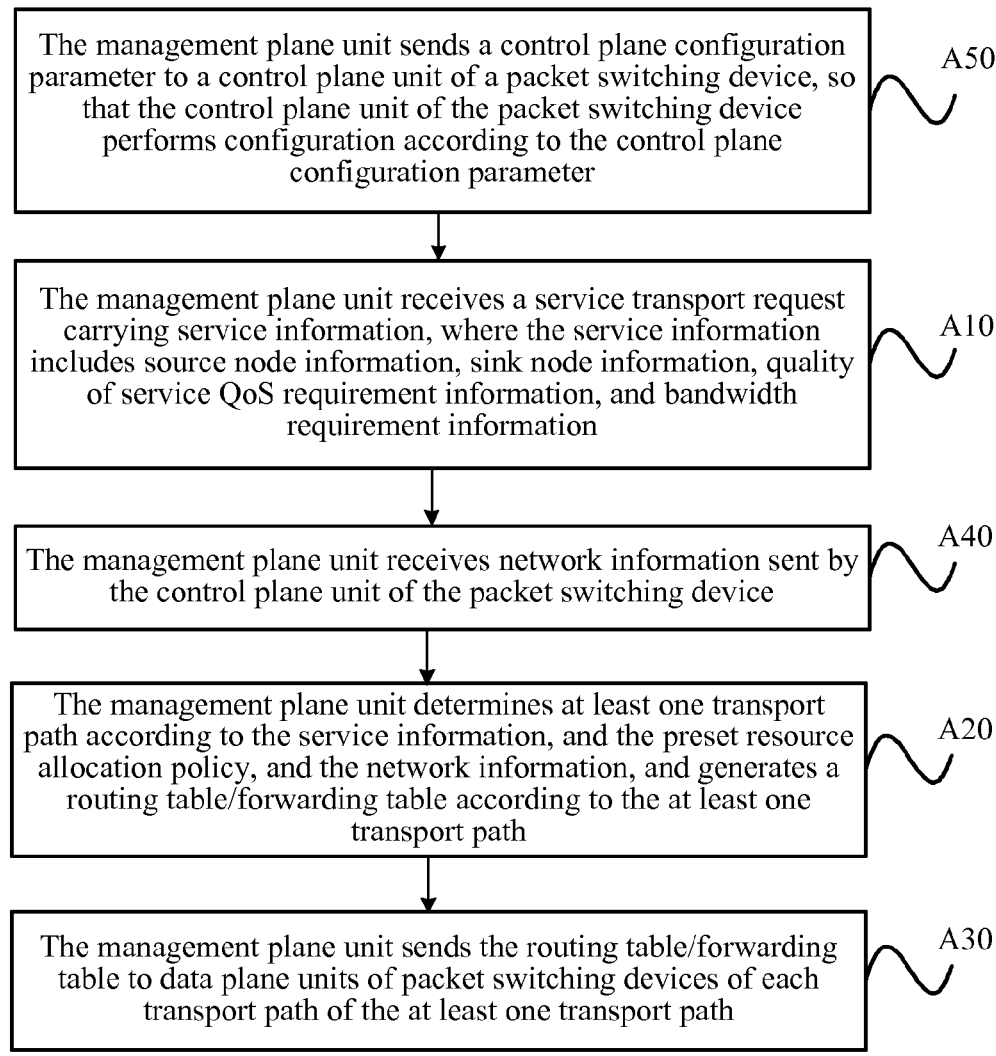
FIG. 2 is a flow chart of a second method for allocating a packet switching resource according to an embodiment of the present invention.

FIG. 2 is a flow chart of a second method for allocating a packet switching resource according to an embodiment of the present invention. As shown in FIG. 2, in this embodiment, in step A20, before the management plane unit determines at least one transport path according to the service information and a preset resource allocation policy, the method may further include:

Step A40: The management plane unit receives network information sent by a control plane unit of a packet switching device.

Correspondingly, step A20 in which the management plane unit determines at least one transport path according to the service information and a preset resource allocation policy may specific ally be that:

the management plane unit determines the at least one transport path according to the service information, the preset resource allocation policy, and the network information.

Specifically, when determining a transport path, the management plane unit may further take a network condition into consideration, and network information may reflect a network condition. A control plane unit of a packet switching device in a packet switched network may collect network information and send the network information to the management plane unit.

In this embodiment, the method for allocating a packet switching resource further includes:

Step A50: The management plane unit sends a control plane configuration parameter to the control plane unit of the packet switching device, so that the control plane unit of the packet switching device configures a routing table/forwarding table of the packet switching device according to the control plane configuration parameter.

Specifically, the management plane unit may further configure each packet switching device in a packet switched network. The management plane unit sends a control plane configuration parameter to the control plane unit of the packet switching device, and the control plane unit configures a routing table/forwarding table of the packet switching device according to the control plane configuration parameter, so that the control plane unit performs execution according to a preset manner, and the control plane unit may accomplish work such as automatic discovery of a resource, automatic creation of an E2E service, and rerouting.

Specifically, in this embodiment, the control plane configuration parameter may include a working parameter, a policy parameter, and a network protocol parameter.

In this embodiment, the service information further includes any one or a combination of a plurality of the following: a minimum hop count, a minimum delay, a minimum cost, highest availability, and a shortest path.

In this embodiment, the service information further includes any one or a combination of a plurality of the following: an explicit node, explicit path information, delay requirement information, and service availability information.

Figure 3:
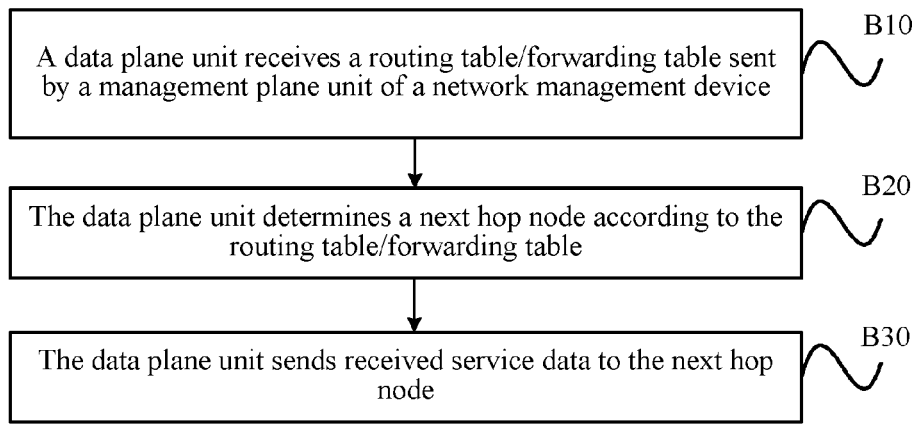
FIG. 3 is a flow chart of a third method for allocating a packet switching resource according to an embodiment of the present invention.

FIG. 3 is a flow chart of a third method for allocating a packet switching resource according to an embodiment of the present invention. As shown in FIG. 3, the method for allocating a packet switching resource according to this embodiment may specifically be implemented in combination with a method applicable to a network management device, and a specific implementation process is no longer described herein. The method for allocating a packet switching resource according to this embodiment may be executed by a packet switching device. A data plane unit is disposed in the packet switching device, so as to implement a function of a data plane.

The method for allocating a packet switching resource according to this embodiment specifically includes:

Step B10: A data plane unit receives a routing table/forwarding table sent by a management plane unit of a network management device.

Step B20: The data plane unit determines a next hop node according to the routing table/forwarding table.

Step B30: The data plane unit sends received service data to the next hop node.

In this embodiment, a data plane unit of a packet switching device receives a routing table/forwarding table sent by a management plane unit of a network management device, determines a next hop node according to the routing table/forwarding table, and sends received service data to the next hop node. A routing table/forwarding table is generated by a management plane unit rather than by a control plane unit of a packet switching device. Therefore, a data plane unit of a packet switching device no longer works depending on a network protocol of a control plane unit, and the data plane unit can perform corresponding routing or forwarding work on a specified service under the configuration of a management plane unit. Furthermore, the management plane unit allocates, in a process of generating a routing table/forwarding table, a network bandwidth resource for a service according to a service requirement. Therefore, allocation of a network bandwidth resource is transparent and controllable, so that utilization efficiency of a network resource is improved.

Figure 4:
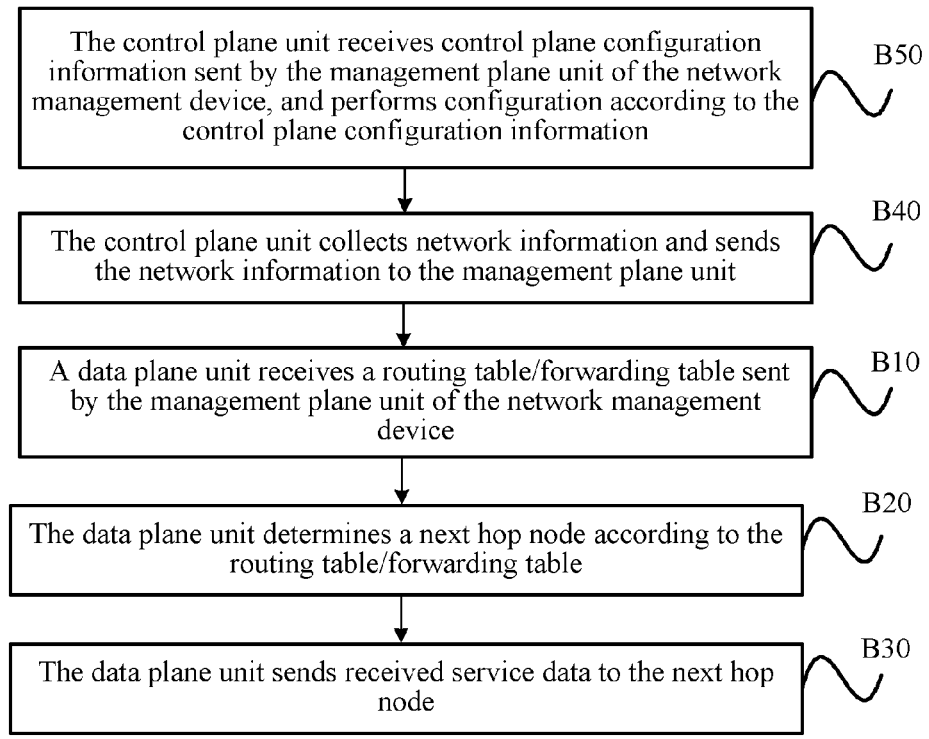
FIG. 4 is a flow chart of a fourth method for allocating a packet switching resource according to an embodiment of the present invention.

FIG. 4 is a flow chart of a fourth method for allocating a packet switching resource according to an embodiment of the present invention. As shown in FIG. 4, in this embodiment, the method for allocating a packet switching resource may further include:

Step B40: A control plane unit collects network information and sends the network information to the management plane unit.

Specifically, packet switching devices in a same autonomous area or packet switching devices at borders of different autonomous areas exchange routing information, port delay information, port priority order information, and port bandwidth information with each other. The information is transported repeatedly among the packet switching devices, and each device can obtain information such as topology of a network in which each device is located. The control plane unit of the packet switching device reports the collected network information to the management plane unit, so that a routing reference for creating a routing table/forwarding table for a service is provided for the management plane unit.

In this embodiment, the method for allocating a packet switching resource may further include:

Step B50: The control plane unit receives control plane configuration information sent by the management plane unit of the network management device, and performs configuration according to the control plane configuration information.

Specifically, the control plane unit configures a routing table/forwarding table of a packet switching device according to a control plane configuration parameter delivered by the management plane unit, the control plane unit performs execution according to a manner preset by the management plane unit, and the control plane unit may accomplish work such as automatic discovery of a resource, automatic creation of an E2E service, and rerouting.

In this embodiment, the control plane configuration parameter includes a working parameter, a policy parameter, and a network protocol parameter.

In this embodiment, the service information further includes any one or a combination of a plurality of the following: a minimum hop count, a minimum delay, a minimum cost, highest availability, and a shortest path.

In this embodiment, the service information further includes any one or a combination of a plurality of the following: an explicit node, explicit path information, delay requirement information, and service availability information.

Figure 5:
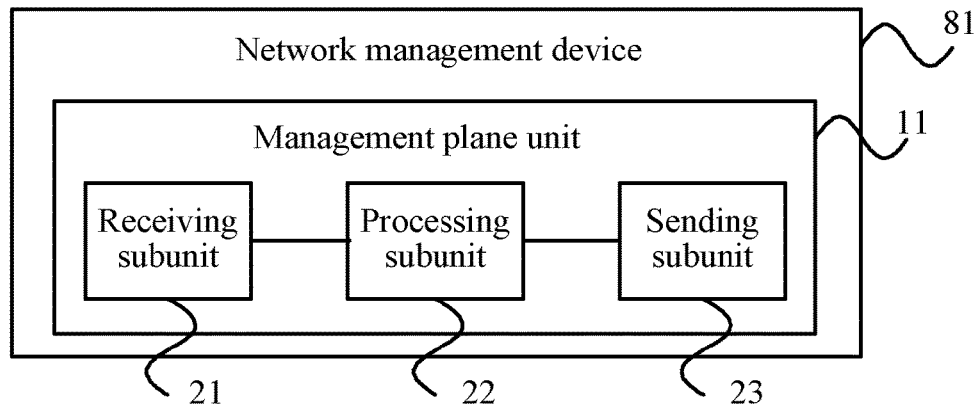
FIG. 5 is a schematic structural diagram of a first network management device according to an embodiment of the present invention.

FIG. 5 is a schematic structural diagram of a first network management device according to an embodiment of the present invention. As shown in FIG. 5, a network management device 81 provided in this embodiment may specifically implement steps of the method for allocating a packet switching resource that is applicable to the network management device 81 and is provided in any embodiment of the present invention, and a specific implementation process is no longer described herein. The network management device 81 in this embodiment specifically includes a management plane unit 11, where the management plane unit 11 includes a receiving subunit 21, a processing subunit 22, and a sending subunit 23. The receiving subunit 21 is configured to receive a service transport request carrying service information, where the service information includes source node information, sink node information, quality of service QoS requirement information, and bandwidth requirement information. The processing subunit 22 is connected to the receiving subunit 21, and is configured to determine at least one transport path according to the service information and a preset resource allocation policy, and generate a routing table/forwarding table according to the at least one transport path. The sending subunit 23 is connected to the processing subunit 22, and is configured to send the routing table/forwarding table to data plane units of packet switching devices of each transport path of the at least one transport path.

With the network management device 81 provided in this embodiment, the receiving subunit 21 of the management plane unit 11 receives a service transport request carrying service information, where the service information includes source node information, sink node information, quality of service QoS requirement information, and bandwidth requirement information; the processing subunit 22 determines at least one transport path according to the service information and a preset resource allocation policy, and generates a routing table/forwarding table according to the at least one transport path; and the sending subunit 23 sends the routing table/forwarding table to data plane units of packet switching devices of each transport path of the at least one transport path. A routing table/forwarding table is generated by the management plane unit 11 rather than by a control plane unit of a packet switching device. Therefore, a data plane unit of a packet switching device no longer works depending on a network protocol of a control plane unit, and the data plane unit can perform corresponding routing or forwarding work on a specified service under the configuration of the management plane unit 11. Furthermore, the management plane unit 11 allocates, in a process of generating a routing table/forwarding table, a network bandwidth resource for a service according to a service requirement. Therefore, allocation of a network bandwidth resource is transparent and controllable, so that utilization efficiency of a network resource is improved.

In this embodiment, the receiving subunit 21 may further be configured to receive network information sent by a control plane unit of a packet switching device. The processing subunit 22 may be specifically configured to determine the at least one transport path according to the service information, the preset resource allocation policy, and the network information.

Specifically, when determining a transport path, the management plane unit 11 may further take a network condition into consideration, and network information may reflect a network condition. A control plane unit of a packet switching device in a packet switched network may collect network information, and send the network information to the management plane unit 11.

In this embodiment, the sending subunit 23 may further be configured to send a control plane configuration parameter to the control plane unit of the packet switching device, so that the control plane unit of the packet switching device configures a routing table/forwarding table of the packet switching device according to the control plane configuration parameter.

In this embodiment, the control plane configuration parameter may specifically include a working parameter, a policy parameter, and a network protocol parameter.

Figure 6:
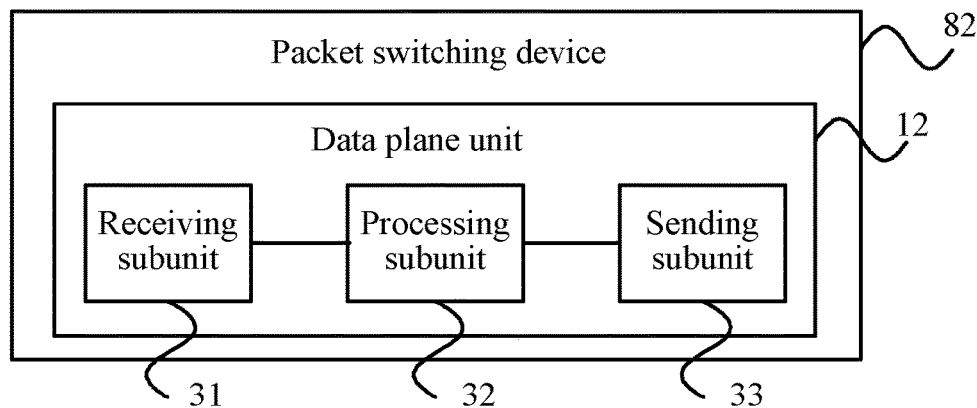
FIG. 6 is a schematic structural diagram of a first packet switching device according to an embodiment of the present invention.

FIG. 6 is a schematic structural diagram of a first packet switching device according to an embodiment of the present invention. As shown in FIG. 6, a packet switching device 82 provided in this embodiment may specifically implement steps of the method for allocating a packet switching resource that is applicable to the packet switching device 82 and is provided in any embodiment of the present invention, and a specific implementation process is no longer described herein. The packet switching device 82 provided in this embodiment includes a data plane unit 12, where the data plane unit 12 includes a receiving subunit 31, a processing subunit 32, and a sending subunit 33. The receiving subunit 31 is configured to receive a routing table/forwarding table sent by a management plane unit of a network management device. The processing subunit 32 is connected to the receiving subunit 31, and is configured to determine a next hop node according to the routing table/forwarding table. The sending subunit 33 is connected to the processing subunit 32, and is configured to send received service data to the next hop node.

With the packet switching device 82 provided in this embodiment, the data plane unit 12 receives a routing table/forwarding table sent by a management plane unit of a network management device, determines a next hop node according to the routing table/forwarding table, and sends received service data to the next hop node. A routing table/forwarding table is generated by a management plane unit rather than by a control plane unit of the packet switching device 82. Therefore, the data plane unit 12 of the packet switching device 82 no longer works depending on a network protocol of a control plane unit, and the data plane unit 12 performs corresponding routing or forwarding work on a specified service under the configuration of a management plane unit. Furthermore, the management plane unit allocates, in a process of generating a routing table/forwarding table, a network bandwidth resource for a service according to a service requirement. Therefore, allocation of a network bandwidth resource is transparent and controllable, so that utilization efficiency of a network resource is improved.

Figure 7:
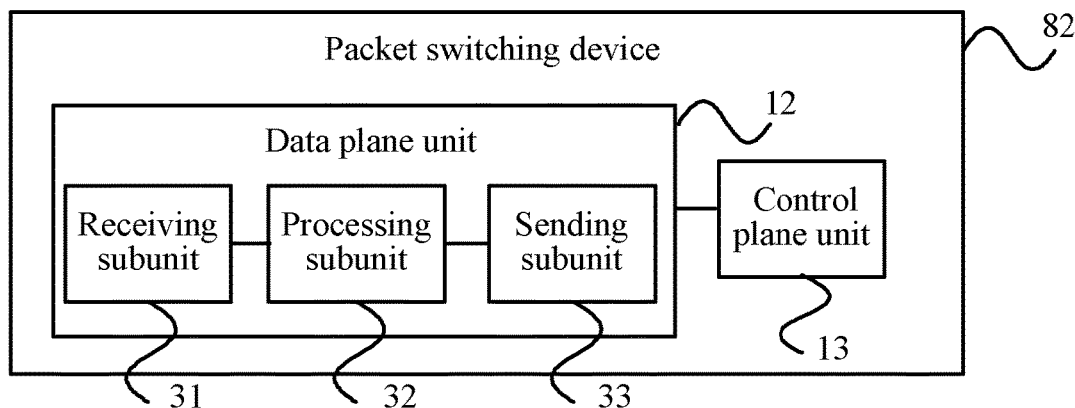
FIG. 7 is a schematic structural diagram of a second packet switching device according to an embodiment of the present invention.

FIG. 7 is a schematic structural diagram of a second packet switching device according to an embodiment of the present invention. As shown in FIG. 6, in this embodiment, the packet switching device 82 may further include a control plane unit 13, where the control plane unit 13 is configured to collect network information and send the network information to the management plane unit of the network management device.

In this embodiment, the control plane unit 13 is further configured to receive control plane configuration information sent by the management plane unit of the network management device and perform configuration according to the control plane configuration information.

In this embodiment, the control plane configuration information includes a working parameter, a policy parameter, and a network protocol parameter.

Figure 8:
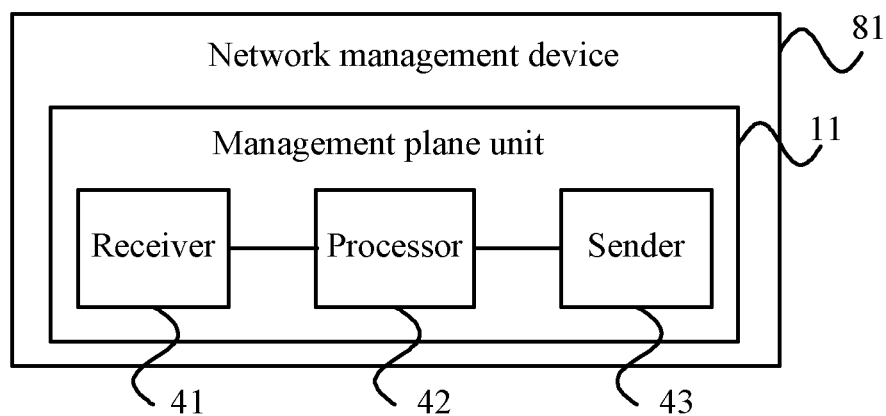
FIG. 8 is a schematic structural diagram of a second network management device according to an embodiment of the present invention.

FIG. 8 is a schematic structural diagram of a second network management device according to an embodiment of the present invention. As shown in FIG. 8, a network management device 81 provided in this embodiment may specifically implement steps of the method for allocating a packet switching resource that is applicable to the network management device and is provided in any embodiment of the present invention, and a specific implementation process is no longer described herein. The network management device 81 provided in this embodiment specifically includes a management plane unit 11, where the management plane unit 11 includes a receiver 41, a processor 42, and a sender 43. The receiver 41 is configured to receive a service transport request carrying service information, where the service information includes source node information, sink node information, quality of service QoS requirement information, and bandwidth requirement information. The processor 42 is connected to the receiver 41, and is configured to determine at least one transport path according to the service information and a preset resource allocation policy, and generate a routing table/forwarding table according to the at least one transport path. The sender 43 is connected to the processor 42, and is configured to send the routing table/forwarding table to data plane units of packet switching devices of each transport path of the at least one transport path.

Figure 9:
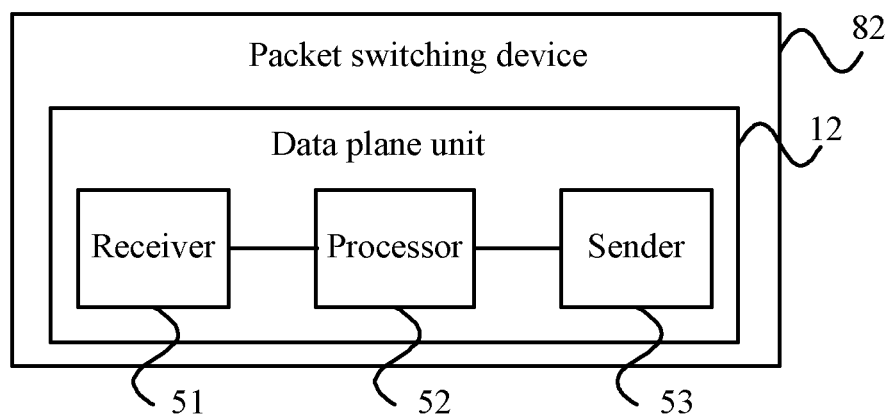
FIG. 9 is a schematic structural diagram of a third packet switching device according to an embodiment of the present invention.

FIG. 9 is a schematic structural diagram of a third packet switching device according to an embodiment of the present invention. As shown in FIG. 9, a packet switching device 82 provided in this embodiment may specifically implement steps of the method for allocating a packet switching resource that is applicable to the packet switching device and is provided in any embodiment of the present invention, and a specific implementation process is no longer described herein. The packet switching device 82 provided in this embodiment specifically includes a data plane unit 12, where the data plane unit 12 includes a receiver 51, a processor 52, and a sender 53. The receiver 51 is configured to receive a routing table/forwarding table sent by a network management device. The processor 52 is connected to the receiver 51, and is configured to determine a next hop node according to the routing table/forwarding table. The sender 53 is connected to the processor 52, and is configured to send received service data to the next hop node.

With the method and the device for allocating a packet switching resource provided in the embodiments of the present invention, a management plane controls a routing table/forwarding table on which a forwarding operation of a data plane of a packet switching device depends, thereby avoiding dependence on a network protocol of a control plane of the packet switching device, so that allocation of a network bandwidth resource is transparent and controllable. In a practical application, to improve management performance, the management plane may transfer a part of setting functions to the control plane of the packet switching device. However, the control plane still needs to work according to configuration of the management plane. Further, when both a conventional device and the device provided in the embodiments of the present invention exist in a packet switched network, the device provided in the embodiments can also implement a function of the conventional device at the same time, so as to implement an interface with the conventional device.

Persons of ordinary skill in the art may understand that all or a part of the steps of the foregoing method embodiments may be implemented by a program instructing relevant hardware. The foregoing program may be stored in a computer readable storage medium. When the program runs, the steps included in the foregoing method embodiments are performed. The foregoing storage medium includes various mediums capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all of the technical features thereof; however, these modifications or replacements do not make the essence of corresponding technical solutions depart from the scope of the technical solutions in the embodiments of the present invention.

What is claimed is:

1. A method for allocating a packet switching resource, comprising:

receiving, by a management plane unit, a service transport request carrying service information, wherein the service information comprises source node information, sink node information, quality of service QoS requirement information, and bandwidth requirement information;

receiving, by the management plane unit, network information sent by a control plane unit of a packet switching device, determining, by the management plane unit, at least one transport path according to the service information, the network information, and a preset resource allocation policy including a hop count, a delay, a cost, an availability and a shortest path, and generating, by the management plane unit, a routing table entry/forwarding table entry for a plurality of different network layers according to the at least one transport path; and sending, by the management plane unit, the routing table entry/forwarding table entry to data plane units of packet switching devices of each transport path of the at least one transport path.

2. The method for allocating the packet switching resource according to claim 1, further comprising:

sending, by the management plane unit, a control plane configuration parameter to the control plane unit of a packet switching device, so that the control plane unit of the packet switching device configures a routing table/forwarding table of the packet switching device according to the control plane configuration parameter.

3. The method for allocating the packet switching resource according to claim 2, wherein the control plane configuration parameter comprises a working parameter, a policy parameter, and a network protocol parameter.

4. The method for allocating the packet switching resource according to claim 1, wherein the hop count is a minimum hop count, the delay is a minimum delay, the cost is a minimum cost, the availability is a highest availability.

5. The method for allocating a packet switching resource according to claim 1, wherein the service information further comprises any one or a combination of a plurality of the following:
an explicit node, explicit path information, a delay requirement information, and service availability information.

6. A method for allocating a packet switching resource, comprising:
collecting, by a control plane unit, network information, and sending the network information to the management plane unit of the network management device;
receiving, by a data plane unit, a routing table/forwarding table for a plurality of different network layers sent by a management plane unit of a network management device; and
determining, by the data plane unit, a next hop node according to the routing table/forwarding table, which is generated by the management plane unit of the network management device instead of the control plane unit; and
sending, by the data plane unit, received service data to the next hop node.

7. The method for allocating a packet switching resource according to claim 6, further comprising:
receiving, by the control plane unit, control plane configuration information sent by the management plane unit of the network management device, and performing configuration according to the control plane configuration information.

8. The method for allocating a packet switching resource according to claim 7, wherein the control plane configuration information comprises a working parameter, a policy parameter, and a network protocol parameter.

9. A network management device, comprising a management plane unit, wherein the management plane unit comprises:
a receiving subunit, configured to receive a service transport request carrying service information, wherein the service information comprises source node information, sink node information, quality of service QoS requirement information, bandwidth requirement information and network information sent by a control plane unit of a packet switching device;
a processing subunit, connected to the receiving subunit, the processing subunit configured to determine at least one transport path according to the service information, the network information, and a preset resource allocation policy including a hop count, a delay, a cost, an availability, and a shortest path, and the processing subunit configured to generate a routing table/forwarding table for a plurality of different network layers according to the at least one transport path; and
a sending subunit, connected to the processing subunit, and configured to send the routing table/forwarding table to data plane units of packet switching devices of each transport path of the at least one transport path.

10. The network management device according to claim 9, wherein:
the sending subunit is further configured to send a control plane configuration parameter to the control plane unit of a packet switching device, so that the control plane unit of the packet switching device configures a routing table/forwarding table of the packet switching device according to the control plane configuration parameter.

11. A packet switching device, comprising a data plane unit, wherein the data plane unit comprises:
a control plane unit, configured to collect network information, and configured to send the network information to a management plane unit of a network management device;
a receiving subunit, configured to receive a routing table/forwarding table sent by the management plane unit of the network management device;
a processing subunit, connected to the receiving subunit, and configured to determine a next hop node according to the routing table/forwarding table for a plurality of different network layers, which is generated by the management plane unit of the network management device instead of the control plane unit; and
a sending subunit, connected to the processing subunit, and configured to send received service data to the next hop node.

12. The packet switching device according to claim 11, wherein the control plane unit is further configured to receive control plane configuration information sent by the management plane unit of the network management device, and perform configuration according to the control plane configuration information.

13. A network management device, comprising a management plane unit, wherein the management plane unit comprises:
a receiver, configured to receive a service transport request carrying service information, wherein the service information comprises source node information, sink node information, quality of service QoS requirement information, bandwidth requirement information and network information sent by a control plane unit of a packet switching device;
a processor, connected to the receiver, and configured to determine at least one transport path according to the service information, the network information, and a preset resource allocation policy including a hop count, a delay, a cost, an availability and a shortest path, and configured to generate a routing table/forwarding table for a plurality of different network layers according to the at least one transport path; and
a sender, connected to the processor, and configured to send the routing table/forwarding table to data plane units of packet switching devices of each transport path of the at least one transport path.

14. A packet switching device, comprising a data plane unit and a control plane unit, wherein the data plane unit comprises:
a receiver, configured to receive a routing table/forwarding table sent by a network management device;
a processor, connected to the receiver, and configured to determine a next hop node according to the routing table/forwarding table for a plurality of different network layers, which is generated by the management plane unit instead of the control plane unit; and
a sender, connected to the processor, and configured to send received service data to the next hop node, and
wherein the control plane unit is configured to collect network information, and configured to send the network information to the management plane unit of a network management device.

* * * * *